(12) United States Patent
Yang et al.

(10) Patent No.: US 9,965,046 B2
(45) Date of Patent: May 8, 2018

(54) KEYBOARD AND NOTEBOOK COMPUTER WITH SAME

(71) Applicant: PRIMAX ELECTRONICS LTD., Taipei (TW)

(72) Inventors: Che-Wei Yang, Taipei (TW); Yi-Chen Wang, Taipei (TW); Wei-Yung Huang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 66 days.

(21) Appl. No.: 15/339,243

(22) Filed: Oct. 31, 2016

(65) Prior Publication Data

US 2017/0371422 A1 Dec. 28, 2017

(30) Foreign Application Priority Data

Jun. 24, 2016 (TW) .............................. 105119943 A

(51) Int. Cl.
*G06F 1/16* (2006.01)
*G06F 3/02* (2006.01)
*H01H 13/7065* (2006.01)

(52) U.S. Cl.
CPC ....... *G06F 3/0202* (2013.01); *H01H 13/7065* (2013.01); *H01H 2203/036* (2013.01); *H01H 2223/042* (2013.01); *H01H 2231/002* (2013.01); *H01H 2233/03* (2013.01)

(58) Field of Classification Search
CPC ....................................... G06F 1/1662–1/1673
See application file for complete search history.

(56) References Cited

U.S. PATENT DOCUMENTS

| 2013/0121017 A1* | 5/2013 | Tsai | G06F 3/0202 |
| | | | 362/602 |
| 2013/0140162 A1* | 6/2013 | Lu | H01H 3/125 |
| | | | 200/344 |
| 2014/0014488 A1* | 1/2014 | Tsai | H01H 13/88 |
| | | | 200/5 A |

\* cited by examiner

*Primary Examiner* — Sanghyuk Park
(74) *Attorney, Agent, or Firm* — Kirton McConkie; Evan R. Witt

(57) ABSTRACT

A keyboard and a notebook computer with the keyboard are provided. The keyboard is installed on the notebook computer. The keyboard includes a membrane circuit board, a key frame, a key, a linking rod and a fixing plate. The linking rod is connected with the key frame. The fixing plate is disposed under the key frame. While the linking rod is rotated relative to the key frame to push the key frame, a position-limiting structure of the key frame is moved along a guiding structure of the fixing plate. Consequently, the key frame is limited to be moved in a first axial direction. Moreover, when the key frame is moved to a locked position at the same level with a keycap of the key, the keycap cannot be pressed down.

20 Claims, 12 Drawing Sheets

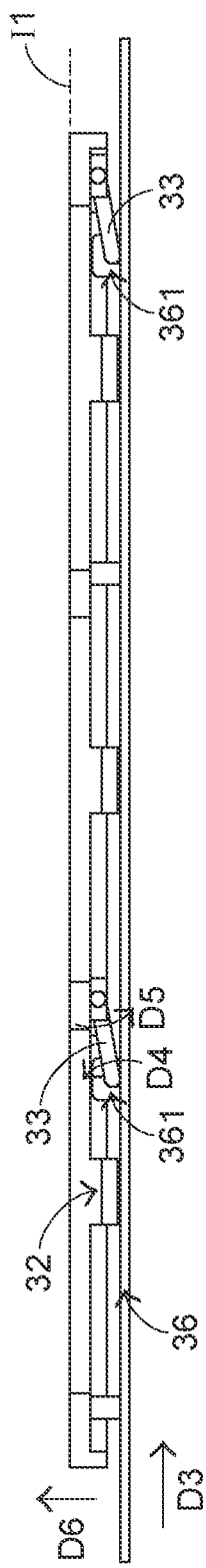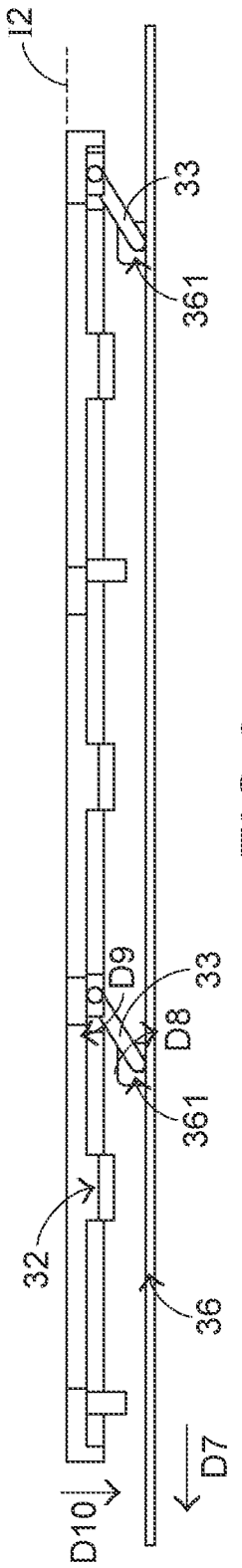

KEYBOARD AND NOTEBOOK COMPUTER WITH SAME

FIELD OF THE INVENTION

The present invention relates to an input device, and more particularly to a keyboard and a notebook computer with the keyboard.

BACKGROUND OF THE INVENTION

Generally, the widely-used peripheral input device of a computer system includes for example a mouse, a keyboard, a trackball, or the like. Via the keyboard, the user can directly input characters or symbols into the computer system. As a consequence, most users and most manufacturers of input devices pay much attention to the development of keyboards.

FIG. 1 is a schematic side view illustrating a portion of a conventional keyboard. As shown in FIG. 1, the keyboard 1 comprises a fixing plate 11, a membrane circuit board 12 and plural keys 13. Each key 13 comprises a keycap 131, a scissors-type connecting element 132 and an elastic element 133. The membrane circuit board 12 is disposed over the fixing plate 11. Moreover, the membrane circuit board 12 comprises plural membrane switches 121 corresponding to the plural keys 13.

The elastic element 132 is arranged between the keycap 131 and the membrane circuit board 12. The scissors-type connecting element 132 comprises a first frame 1321 and a second frame 1322. The keycap 131 comprises a first keycap fixing structure 1311 and a second keycap fixing structure 1312. The fixing plate 11 comprises a first fixing structure 111 and a second fixing structure 112. The first fixing structure 111 and the second fixing structure 112 are penetrated upwardly through the membrane circuit board 12. Two ends of the first frame 1321 are connected with the second fixing structure 112 of the fixing plate 11 and the first keycap fixing structure 1311 of the keycap 131, respectively. Two ends of the second frame 1322 are connected with the first fixing structure 111 of the fixing plate 11 and the second keycap fixing structure 1312 of the keycap 131, respectively.

While the keycap 131 of any key 13 is depressed and moved downwardly relative to the fixing plate 11, the first frame 1321 and the second frame 1322 of the scissors-type connecting element 132 are switched from an open-scissors state to a stacked state. Moreover, as the keycap 131 is moved downwardly to compress the elastic element 133, the corresponding membrane switch 121 is pushed by the elastic element 133. Consequently, the keyboard 1 generates a corresponding key signal. When the keycap 131 of the key 13 is no longer depressed, the keycap 131 is moved upwardly relative to the fixing plate 11 in response to an elastic force of the elastic element 133. Meanwhile, the first frame 1321 and the second frame 1322 of the scissors-type connecting element 132 are switched from the stacked state to the open-scissors state again, and the keycap 131 is returned to its original position. The detailed structures and actions of the scissors-type connecting element 132 of the conventional key 13 are well known to those skilled in the art, and are not redundantly described herein.

FIG. 2 is a schematic perspective view illustrating a portion of a conventional notebook computer with a keyboard. As shown in FIG. 2, the notebook computer 2 comprises a base 21, a top cover 22, a rotary shaft 23, a keyboard 1 and a display screen 24. The display screen 24 is installed on the top cover 22. The keyboard 1 is installed on the base 21. The top cover 22 is pivotally coupled with the base 21 through the rotary shaft 23. Consequently, the top cover 22 can be moved relative to the base 21 and changed from an opened position to a closed position in a direction D1, or the top cover 22 can be moved relative to the base 21 and changed from the closed position to the opened position in a direction D2. The structure and function of the keyboard 1 are similar to those of FIG. 1, and are not redundantly described herein.

For facilitating the user to operate the notebook computer 2, the display screen 24 of the notebook computer 2 is a touch screen. Moreover, as the top cover 22 is rotated in a direction toward a rear side of the base 21 through the rotary shaft 23, the top cover 22 is folded to be contacted with a rear surface of the base 21, and the display screen 24 is exposed. Meanwhile, the notebook computer 2 has the outer appearance like a tablet computer. The notebook computer 2 having the appearance of the tablet computer is shown in FIG. 3. Consequently, the display screen 24 can be operated by the user through the user's finger or a touch pen.

However, the keyboard 1 of the notebook computer 2 in the tablet mode is also exposed. When the notebook computer 2 is held by the user's hands, the fingers of the user may erroneously press the keys 13 of the keyboard 1. Since the pressed keys 13 are moved downwardly to form a concave region, it is difficult for the user to stably hold the notebook computer 2. Moreover, if the key 13 is erroneously triggered when the notebook computer 2 is held by the user's hands, the notebook computer 2 generates a key signal. The erroneous operation of the notebook computer 2 usually confuses the user. In other words, the conventional keyboard and the notebook computer with the keyboard need to be further improved.

SUMMARY OF THE INVENTION

An object of the present invention provides a keyboard having a function of avoiding erroneously pressing down the keycaps. When a linking rod is driven and the linking rod is rotated relative to a key frame to push the key frame, the key frame is moved in a first axial direction to a locked position at the same level with the keycap. When the key frame is in the locked position, the keycap cannot be pressed down. Consequently, the corresponding membrane switch is not erroneously triggered.

Another object of the present invention provides a notebook computer with the keyboard of the present invention. As a top cover is rotated in a direction toward a rear side of the base and the top cover is contacted with a rear surface of the base, both of the display screen and the keyboard are exposed. Meanwhile, the keys of the keyboard cannot be pressed down. Consequently, the notebook computer can be stably held by the user. Moreover, since the keys are not erroneously pressed down, the problem of causing the erroneous operations of the notebook computer will be avoided.

In accordance with an aspect of the present invention, there is provided a keyboard. The keyboard includes a membrane circuit board, a key frame, a key, a fixing plate and a linking rod. The membrane circuit board includes a membrane switch. The key frame includes a receiving hole and a position-limiting structure. The position-limiting structure is protruded externally from the key frame. The key corresponds to the membrane switch. The key includes a keycap. The keycap is movable within the receiving hole when the keycap is depressed. The fixing plate is disposed under the key frame, and includes a guiding structure corresponding to the position-limiting structure. The linking rod is pivotally coupled to the key frame. While the linking rod is rotated relative to the key frame to push the key frame, the position-limiting structure is moved along the guiding structure. Consequently, the key frame is limited to be moved in a first axial direction.

In accordance with another aspect of the present invention, there is provided a notebook computer. The notebook computer includes a base, a top cover and a keyboard. The top cover is pivotally coupled with the base. The keyboard is installed on the base. The keyboard includes a membrane circuit board, a key frame, a key, a fixing plate and a linking rod. The membrane circuit board includes a membrane switch. The key frame includes a receiving hole and a position-limiting structure. The position-limiting structure is protruded externally from the key frame. The key corresponds to the membrane switch. The key includes a keycap. The keycap is movable within the receiving hole when the keycap is depressed. The fixing plate is disposed under the key frame, and includes a guiding structure corresponding to the position-limiting structure. The linking rod is pivotally coupled to the key frame. While the top cover is rotated in a direction toward a rear side of the base, the linking rod is rotated relative to the key frame to push the key frame to an locked position at the same level with the keycap, and the position-limiting structure is moved along the guiding structure. Consequently, the key frame is limited to be moved in a first axial direction.

The above objects and advantages of the present invention will become more readily apparent to those ordinarily skilled in the art after reviewing the following detailed description and accompanying drawings, in which:

BRIEF DESCRIPTION OF THE DRAWINGS

FIG. 8 is a schematic cross-sectional view illustrating the relationship between the key frame, the linking rod and the movable plate of the keyboard of FIG. 4 when the key frame of the keyboard is in the enabled position;

FIG. 9 is a schematic cross-sectional view illustrating the relationship between the key frame, the linking rod and the movable plate of the keyboard of FIG. 4 when the key frame of the keyboard is in the locked position;

DETAILED DESCRIPTION OF THE PREFERRED EMBODIMENT

Figure 4:
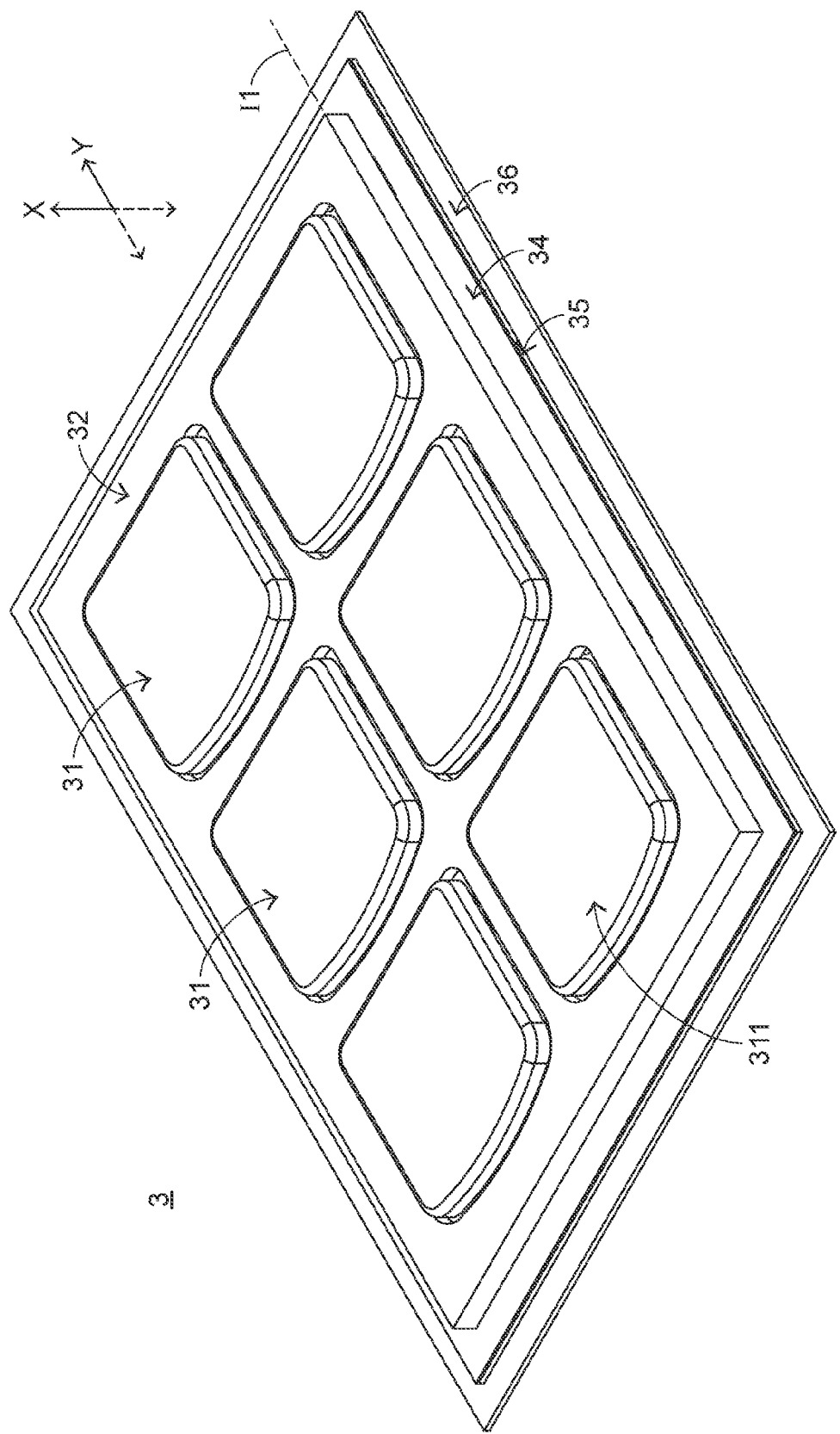
FIG. 4 is a schematic perspective view illustrating a portion of a keyboard according to a first embodiment of the present invention, in which the key frame of the keyboard is lower than the keycap and in an enabled position.
Figure 5:
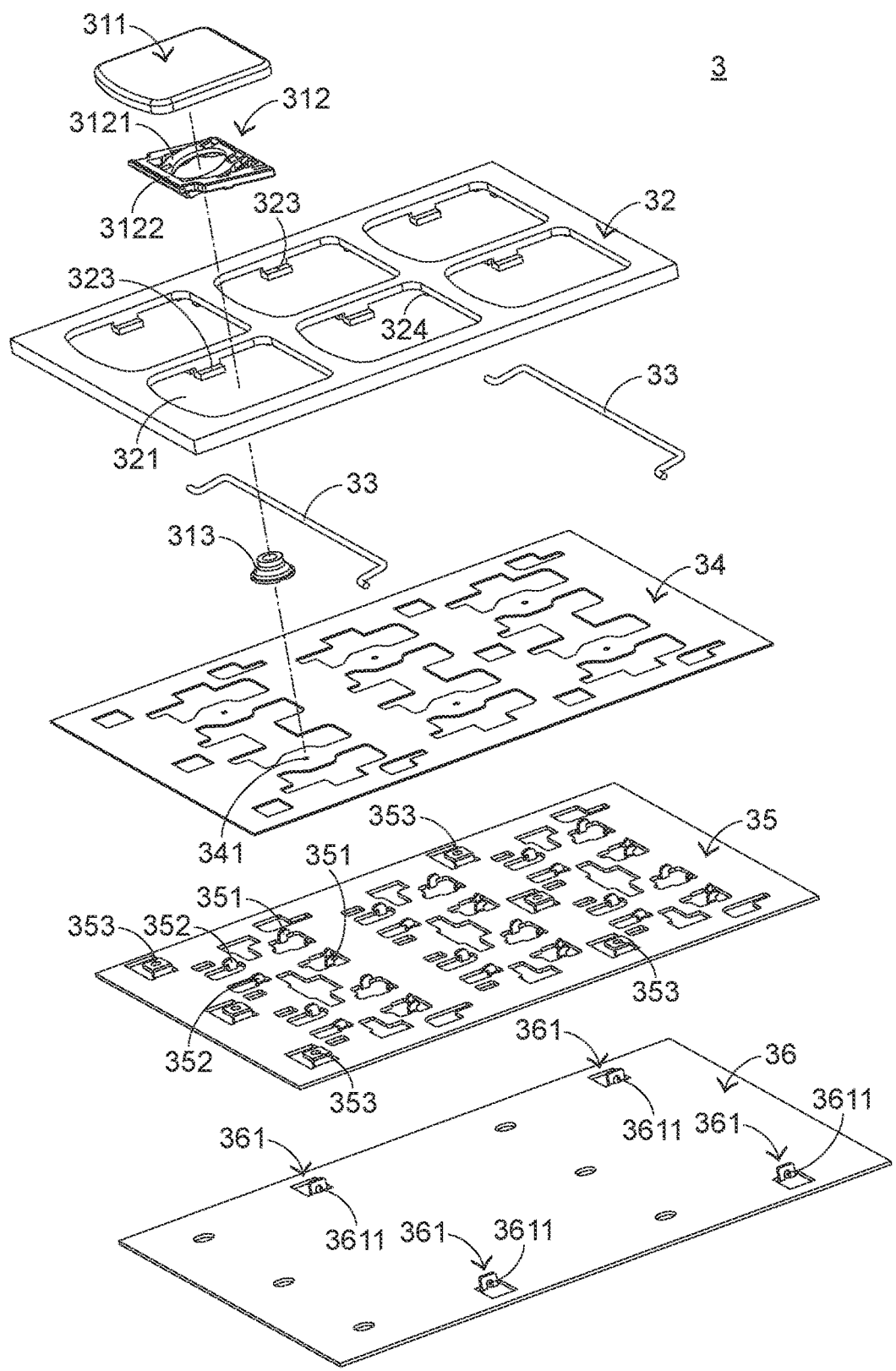
FIG. 5 is a schematic exploded view illustrating a portion of the keyboard of FIG. 4 and taken along a first viewpoint.
Figure 6:
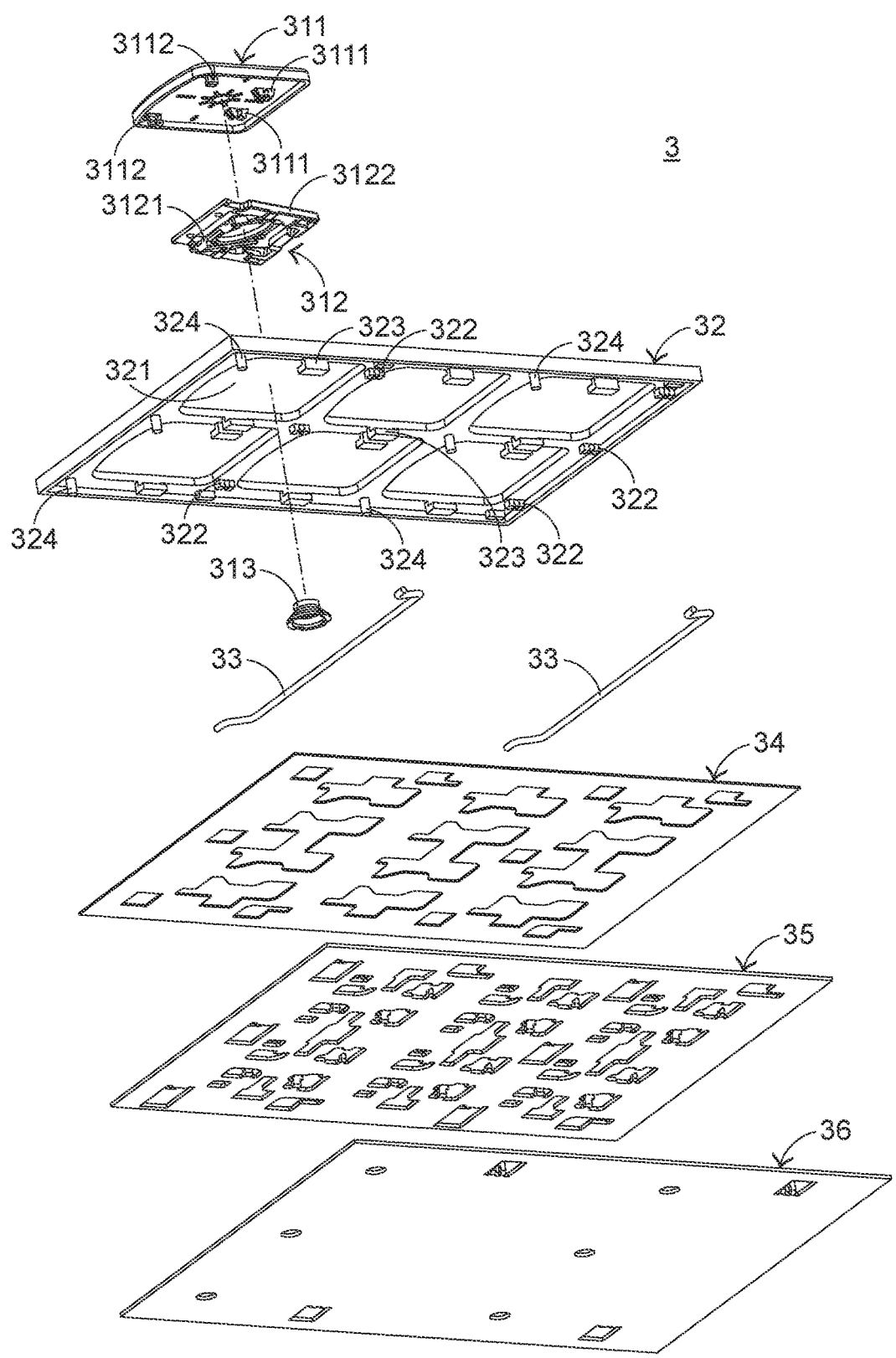
FIG. 6 is a schematic exploded view illustrating a portion of the keyboard of FIG. 4 and taken along a second viewpoint.
Figure 7:
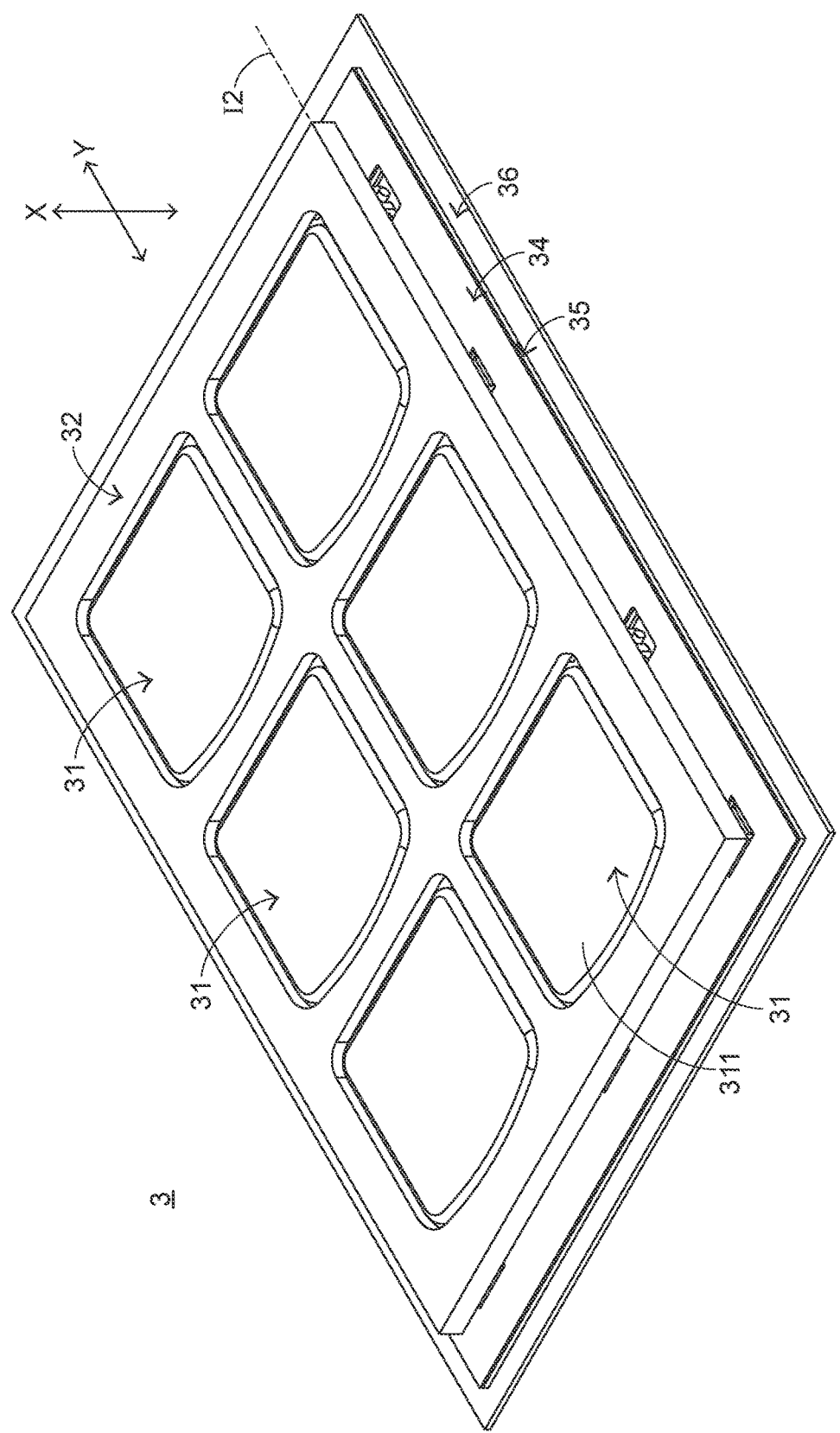
FIG. 7 is a schematic perspective view illustrating the keyboard of FIG. 4, in which the key frame of the keyboard is at the same level with the keycap and in a locked position.

FIG. 4 is a schematic perspective view illustrating a portion of a keyboard according to a first embodiment of the present invention, in which the key frame of the keyboard is lower than the keycap and in an enabled position. FIG. 5 is a schematic exploded view illustrating a portion of the keyboard of FIG. 4 and taken along a first viewpoint. FIG. 6 is a schematic exploded view illustrating a portion of the keyboard of FIG. 4 and taken along a second viewpoint. FIG. 7 is a schematic perspective view illustrating the keyboard of FIG. 4, in which the key frame of the keyboard is at the same level with the keycap and in a locked position. As shown in FIGS. 4-7, the keyboard 3 comprises plural keys 31, a key frame 32, plural linking rods 33, a membrane circuit board 34 and a fixing plate 35. Each key 31 comprises a keycap 311, a connecting element 312 and an elastic element 313. The membrane circuit board 34 is disposed over the fixing plate 35. Moreover, the membrane circuit board 34 comprises a membrane switch 341 corresponding to the key 31.

The elastic element 313 is arranged between the keycap 311 and the membrane circuit board 34. The connecting element 312 is connected between the fixing plate 35 and the keycap 311. In this embodiment, the connecting element 312 is a scissors-type connecting element comprising a first frame 3121 and a second frame 3122. The keycap 311 comprises a first keycap fixing structure 3111 and a second keycap fixing structure 3112. The fixing plate 35 comprises a first fixing structure 351 and a second fixing structure 352. The first fixing structure 351 and the second fixing structure 352 are penetrated upwardly through the membrane circuit board 34. Two ends of the first frame 3121 are connected with the second fixing structure 352 of the fixing plate 35 and the first keycap fixing structure 3111 of the keycap 311, respectively. Two ends of the second frame 3122 are connected with the first fixing structure 351 of the fixing plate 35 and the second keycap fixing structure 3112 of the keycap 311, respectively. The connecting relationship between the connecting element 312, the fixing plate 35 and the keycap 311 is presented herein for purpose of illustration and description only.

The key frame 32 comprises plural receiving holes 321 and plural hooks 322. The plural hooks 322 are protruded downwardly. Each receiving hole 321 is used for receiving the corresponding key 31 and allowing movement of the corresponding key 31 therein. The linking rod 33 is pivotally coupled to the key frame 32 through the corresponding hooks 322. As the linking rod 33 is rotated relative to the key frame 32, the key frame 32 is pushed to be moved in a first axial direction X. That is, the key frame 32 can be moved from an enabled position I1 (see FIG. 8) to a locked position I2 (see FIG. 9) or moved from the locked position I2 to the enabled position I1. In the enabled position I1, the key frame 32 is lower than the keycap 311. In the locked position I2, the key frame 32 is at the same level with the keycap 311. The movement of the key frame between the enabled position I1 and the locked position I2 will be described later.

In this embodiment, the keyboard 3 further comprises a movable plate 36. The movable plate 36 is disposed under the fixing plate 35 and movable relative to the fixing plate 35 in a second axial direction Y. The movable plate 36 comprises plural protrusion structures 361. The protrusion structures 361 are protruded from a top surface of the movable plate 36 and penetrated upwardly through the fixing plate 361. Moreover, the protrusion structure 361 has a perforation 3611. An end of the corresponding linking rod 33 is penetrated through the perforation 3611. In this embodiment, the first axial direction X is a vertical direction, and the second axial direction Y is a horizontal direction.

Please refer to FIGS. 8 and 9. FIG. 8 is a schematic cross-sectional view illustrating the relationship between the key frame, the linking rod and the movable plate of the keyboard of FIG. 4 when the key frame of the keyboard is in the enabled position. FIG. 9 is a schematic cross-sectional view illustrating the relationship between the key frame, the linking rod and the movable plate of the keyboard of FIG. 4 when the key frame of the keyboard is in the locked position. A process of moving the key frame 32 from the enabled position I1 (i.e., lower than the keycap 311) to the locked position I2 (i.e., at the same level with the keycap 311) will be described as follows. As shown in FIG. 8, the key frame 32 is in the enabled position I1. While the movable plate 36 is moved relative to the fixing plate 35 in the second axial direction Y (e.g., a direction D3), the linking rod 33 penetrated through the perforation 3611 of the protrusion structure 361 is pushed by the protrusion structure 361. Consequently, the linking rod 33 is rotated relative to the protrusion structure 361 in a direction D4, and the linking rod 33 is rotated relative to the key frame 32 in a direction D5. Under this circumstance, the key frame 32 is moved upwardly in the first axial direction X (e.g., a direction D6) to the locked position I2 (i.e., at the same level with the keycap 311). The key frame 32 in the locked position I2 is shown in FIG. 9.

A process of moving the key frame 32 from the locked position I2 to the enabled position I1 will be described as follows. While the movable plate 36 is moved relative to the fixing plate 35 in the second axial direction Y (e.g., in a direction D7 opposite to the direction D3), the linking rod 33 penetrated through the perforation 3611 of the protrusion structure 361 is pushed by the protrusion structure 361. Consequently, the linking rod 33 is rotated relative to the protrusion structure 361 in a direction D8 opposite to the direction D4, and the linking rod 33 is rotated relative to the key frame 32 in a direction D9 opposite to the direction D5. Under this circumstance, the key frame 32 is moved upwardly in the first axial direction X (e.g., in a direction D10 reverse to the direction D6) to the enabled position I1 (i.e., lower than the keycap 311).

Please refer to FIGS. 5 and 6 again. When the key frame 32 is in the enabled position I1 (i.e., lower than the keycap 311), the keycap 311 of the key 31 can be pressed down. While the keycap 311 of the key 31 is depressed and moved downwardly relative to the membrane circuit board 34, the first frame 3121 and the second frame 3122 of the connecting element 312 are switched from an open-scissors state to a stacked state. Moreover, as the keycap 311 is moved downwardly to compress the elastic element 313, the corresponding membrane switch 341 of the membrane circuit board 34 is pushed by the elastic element 313. Consequently, the keyboard 3 generates a corresponding key signal. When the keycap 311 of the key 31 is no longer depressed, the keycap 311 is moved upwardly relative to the membrane circuit board 34 in response to an elastic force of the elastic element 313. Meanwhile, the first frame 3121 and the second frame 3122 of the connecting element 312 are switched from the stacked state to the open-scissors state again, and the keycap 311 is returned to its original position.

In this embodiment, the key frame 32 further comprises a stopping structure 323. The stopping structure 323 is protruded downwardly from a sidewall of the receiving hole 321. When the key frame 32 is in the locked position I2 (i.e., at the same level with the keycap 311), the stopping structure 323 is contacted with a bottom surface of the keycap 311 to stop the movement of the keycap 311 within the receiving hole 321. Meanwhile, since the keycap 311 of the key 31 is stopped by the stopping structure 323 of the key frame 32, the keycap 311 cannot be moved downwardly relative to the membrane circuit board 34.

The key frame 32 further comprises a position-limiting structure 324. The position-limiting structure 324 is protruded externally from the key frame 32. The fixing plate 35 further comprises a guiding structure 353 corresponding to the position-limiting structure 324. While the linking rod 33 is rotated relative to the key frame 32 to push the key frame 32, the position-limiting structure 324 is moved along the guiding structure 353. Consequently, the key frame 32 is limited to be moved in the first axial direction X only. That is, the key frame 32 is not shifted or rocked while the key frame 32 is ascended. In an embodiment, the position-limiting structure 324 and the guiding structure 353 are a position-limiting post and a position-limiting hole, respectively. It is noted that the examples of the position-limiting structure 324 and the guiding structure 353 are not restricted. For example, in another embodiment, the guiding structure 353 is a position-limiting groove that is extended in the first axial direction X.

As mentioned above, the linking rod 33 is driven to be rotated relative to the key frame 32 and the key frame 32 is ascended in the first axial direction X to the locked position I2 (i.e., at the same level with the keycap 311). Even if the keycap 311 is pressed by the user at this moment, the keycap 311 is not moved downwardly. As a consequence, the problem of erroneously triggering the membrane switch 341 is avoided. When the user wants to operate the key 31 again, the linking rod 33 is driven to be rotated relative to the key frame 32 and the key frame 32 is descended in the first axial direction X to the enabled position I1 (i.e., lower than the keycap 311). Meanwhile, the key 31 is operable.

The above example is presented herein for purpose of illustration and description only. It is noted that numerous modifications and alterations may be made while retaining the teachings of the invention. For example, in another embodiment, the movable plate 36 is disposed over the fixing plate 35. In the above embodiment, the movable plate 36 is moved in the second axial direction Y to drive the rotation of the linking rod 33 relative to the key frame 32 and push the key frame 32. Moreover, the driving mechanism for driving the linking rod 33 may be modified. Hereinafter, some variant examples of the driving mechanism will be described with reference to FIGS. 10, 11 and 12.

Figure 10A:
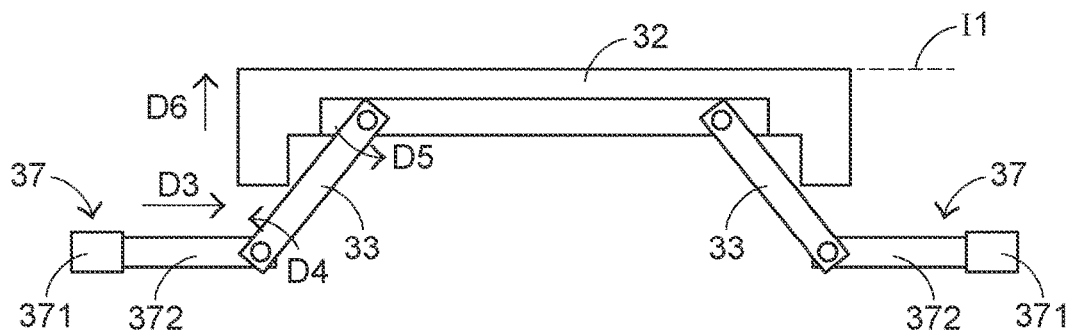
FIG. 10A is a schematic cross-sectional view illustrating the relationship between a key frame, a linking rod and a screw driving mechanism of a keyboard according to a second embodiment of the present invention, in which the key frame of the keyboard is in the enabled position.
Figure 10B:
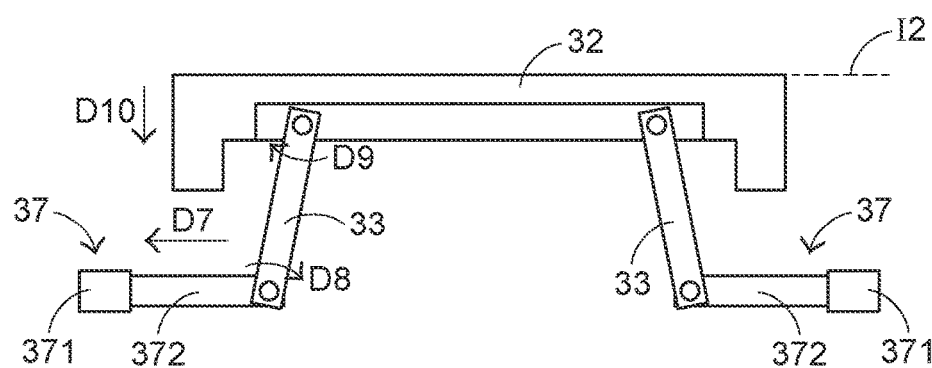
FIG. 10B is a schematic cross-sectional view illustrating the relationship between the key frame, the linking rod and the screw driving mechanism of the keyboard of FIG. 10A, in which the key frame of the keyboard is in the locked position.

FIG. 10A is a schematic cross-sectional view illustrating the relationship between a key frame, a linking rod and a screw driving mechanism of a keyboard according to a second embodiment of the present invention, in which the key frame of the keyboard is in the enabled position. FIG. 10B is a schematic cross-sectional view illustrating the relationship between the key frame, the linking rod and the screw driving mechanism of the keyboard of FIG. 10A, in which the key frame of the keyboard is in the locked position. The structures and functions of the components of the key structure of this embodiment which are identical to those of the first embodiment are not redundantly described herein. In comparison with the first embodiment, the keyboard of this embodiment further comprises at least one screw driving mechanism 37. The screw driving mechanism 37 can replace the movable plate 36. Moreover, the screw driving mechanism 37 comprises a screw part 371 and a transmission part 372. The transmission part 372 is connected between the linking rod 33 and the screw part 371.

Please refer to the screw driving mechanism 37 at the left side of FIG. 10A. By twisting the screw part 371, the transmission part 372 is moved in the second axial direction Y (e.g., a direction D3) to push the linking rod 33. Consequently, the linking rod 33 is rotated relative to the transmission part 372 in the direction D4, and the linking rod 33 is rotated relative to the key frame 32 in the direction D5. Under this circumstance, the key frame 32 is moved upwardly in the first axial direction X (e.g., the direction D6) to the locked position I2 (i.e., at the same level with the keycap 311). The key frame 32 in the locked position I2 is shown in FIG. 10B.

Please refer to the screw driving mechanism 37 at the left side of FIG. 10B. By oppositely twisting the screw part 371, the transmission part 372 is moved in the second axial direction Y (e.g., in the direction D7) to push the linking rod 33. Consequently, the linking rod 33 is rotated relative to the transmission part 372 in the direction D8, and the linking rod 33 is rotated relative to the key frame 32 in the direction D9. Under this circumstance, the key frame 32 is moved upwardly in the first axial direction X (e.g., in the direction D10) to the enabled position I1 (i.e., lower than the keycap 311). The key frame 32 in the enabled position I1 is shown in FIG. 10A.

Figure 11A:
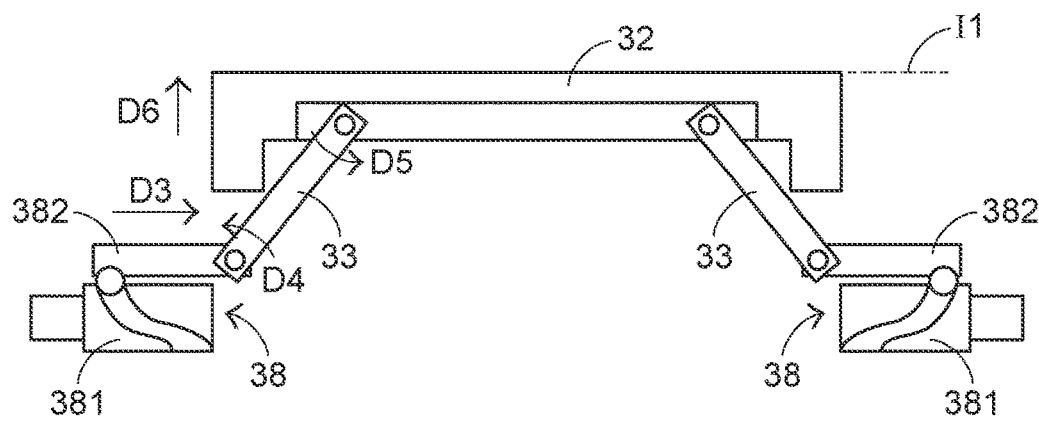
FIG. 11A is a schematic cross-sectional view illustrating the relationship between a key frame, a linking rod and a cam driving mechanism of a keyboard according to a third embodiment of the present invention, in which the key frame of the keyboard is in the enabled position.

FIG. 11A is a schematic cross-sectional view illustrating the relationship between a key frame, a linking rod and a cam driving mechanism of a keyboard according to a third embodiment of the present invention, in which the key frame of the keyboard is in the enabled position.

Figure 11B:
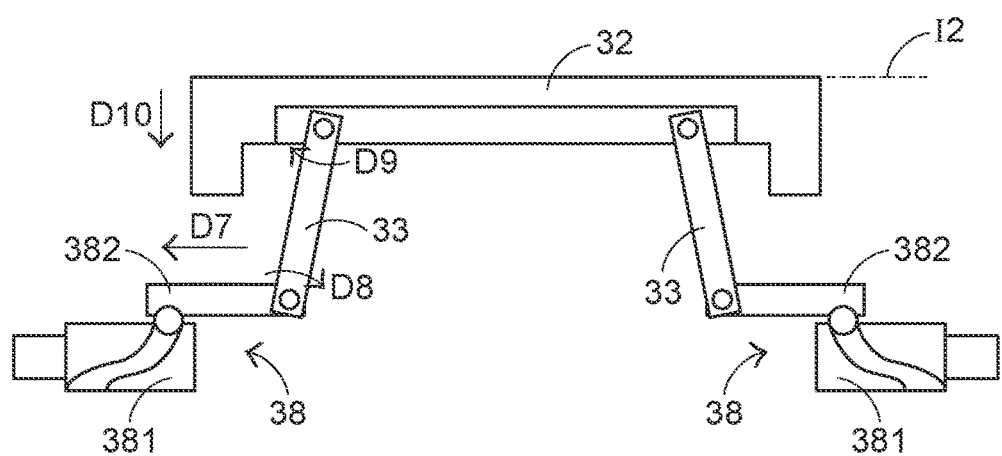
FIG. 11B is a schematic cross-sectional view illustrating the relationship between the key frame, the linking rod and the cam driving mechanism of the keyboard of FIG. 11A, in which the key frame of the keyboard is in the locked position.

FIG. 11B is a schematic cross-sectional view illustrating the relationship between the key frame, the linking rod and the cam driving mechanism of the keyboard of FIG. 11A, in which the key frame of the keyboard is in the locked position. The structures and functions of the components of the key structure of this embodiment which are identical to those of the first embodiment are not redundantly described herein. In comparison with the first embodiment, the keyboard of this embodiment further comprises a cam driving mechanism 38. The cam driving mechanism 38 can replace the movable plate 36. Moreover, the cam driving mechanism 38 comprises a cam part 381 and a transmission part 382. The transmission part 382 is connected between the linking rod 33 and the cam part 381.

Please refer to the cam driving mechanism 38 at the left side of FIG. 11A. By rotating the cam part 381, the transmission part 382 is moved in the second axial direction Y (e.g., the direction D3) to push the linking rod 33. Consequently, the linking rod 33 is rotated relative to the transmission part 382 in the direction D4, and the linking rod 33 is rotated relative to the key frame 32 in the direction D5. Under this circumstance, the key frame 32 is moved upwardly in the first axial direction X (e.g., the direction D6) to the locked position I2 (i.e., at the same level with the keycap 311). The key frame 32 in the locked position I2 is shown in FIG. 11B.

Please refer to the cam driving mechanism 38 at the left side of FIG. 11B. By oppositely rotating the cam part 381, the transmission part 382 is moved in the second axial direction Y (e.g., in the direction D7) to push the linking rod 33. Consequently, the linking rod 33 is rotated relative to the transmission part 382 in the direction D8, and the linking rod 33 is rotated relative to the key frame 32 in the direction D9. Under this circumstance, the key frame 32 is moved upwardly in the first axial direction X (e.g., in the direction D10) to the enabled position I1 (i.e., lower than the keycap 311). The key frame 32 in the enabled position I1 is shown in FIG. 11A.

Figure 12A:
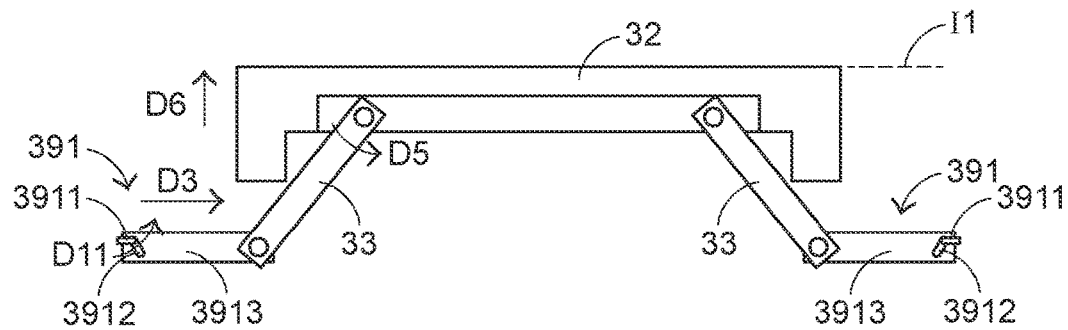
FIG. 12A is a schematic cross-sectional view illustrating the relationship between a key frame, a linking rod and a driving mechanism of a keyboard according to a fourth embodiment of the present invention, in which the key frame of the keyboard is in the enabled position.
Figure 12B:
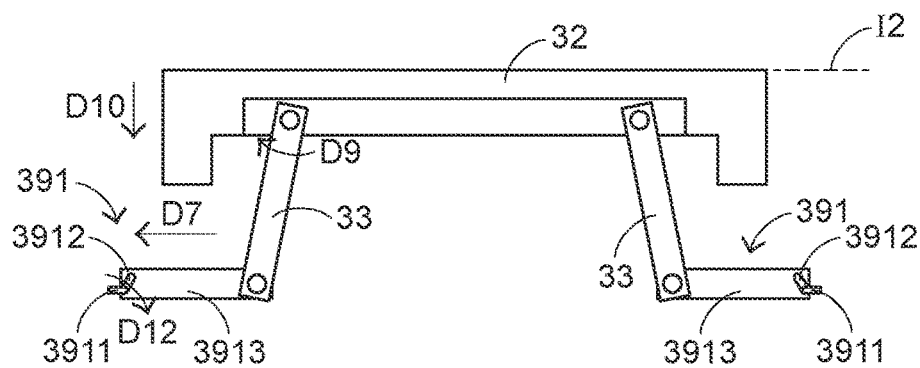
FIG. 12B is a schematic cross-sectional view illustrating the relationship between the key frame, the linking rod and the driving mechanism of the keyboard of FIG. 12A, in which the key frame of the keyboard is in the locked position.

FIG. 12A is a schematic cross-sectional view illustrating the relationship between a key frame, a linking rod and a driving mechanism of a keyboard according to a fourth embodiment of the present invention, in which the key frame of the keyboard is in the enabled position. FIG. 12B is a schematic cross-sectional view illustrating the relationship between the key frame, the linking rod and the driving mechanism of the keyboard of FIG. 12A, in which the key frame of the keyboard is in the locked position. The structures and functions of the components of the key structure of this embodiment which are identical to those of the first embodiment are not redundantly described herein. In comparison with the first embodiment, the keyboard of this embodiment further comprises a driving mechanism 39. The driving mechanism 39 can replace the movable plate 36. Moreover, the driving mechanism 39 comprises a transmission assembly 391 including a first transmission part 3911, a second transmission part 3912 and a third transmission part 3913. The second transmission part 3912 is arranged between the first transmission part 3911 and the third transmission part 3913. The third transmission part 3913 is arranged between the second transmission part 3912 and the linking rod 33.

Please refer to the cam driving mechanism 39 at the left side of FIG. 12A. By moving the first transmission part 3911 downwardly, the second transmission part 3912 is rotated relative to the first transmission part 3911 in a direction D11, and the third transmission part 3913 is correspondingly moved in the second axial direction Y (e.g., the direction D3) to push the linking rod 33. Consequently, the linking rod 33 is rotated relative to the key frame 32 in the direction D5. Under this circumstance, the key frame 32 is moved upwardly in the first axial direction X (e.g., the direction D6) to the locked position I2 (i.e., at the same level with the keycap 311). The key frame 32 in the locked position I2 is shown in FIG. 12B.

Please refer to the cam driving mechanism 39 at the left side of FIG. 12B. By moving the first transmission part 3911 upwardly, the second transmission part 3912 is rotated relative to the first transmission part 3911 in a direction D12, and the third transmission part 3913 is correspondingly moved in the second axial direction Y (e.g., in the direction D7) to push the linking rod 33. Under this circumstance, the key frame 32 is moved upwardly in the first axial direction X (e.g., in the direction D10) to the enabled position I1 (i.e., lower than the keycap 311). The key frame 32 in the enabled position I1 is shown in FIG. 12A.

Figure 13:
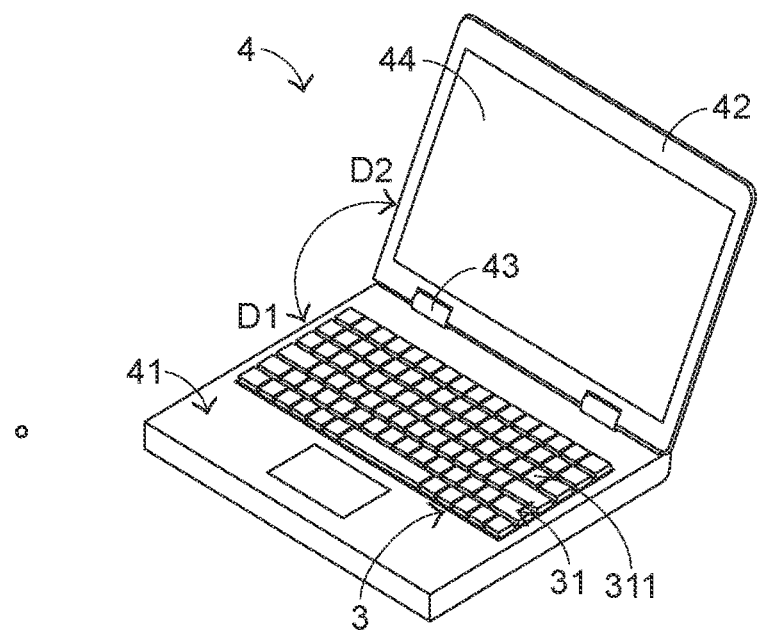
FIG. 13 is a schematic perspective view illustrating a notebook computer with the keyboard of the present invention, in which the notebook computer is in a laptop mode and the keyboard is in the usage status.
Figure 14:
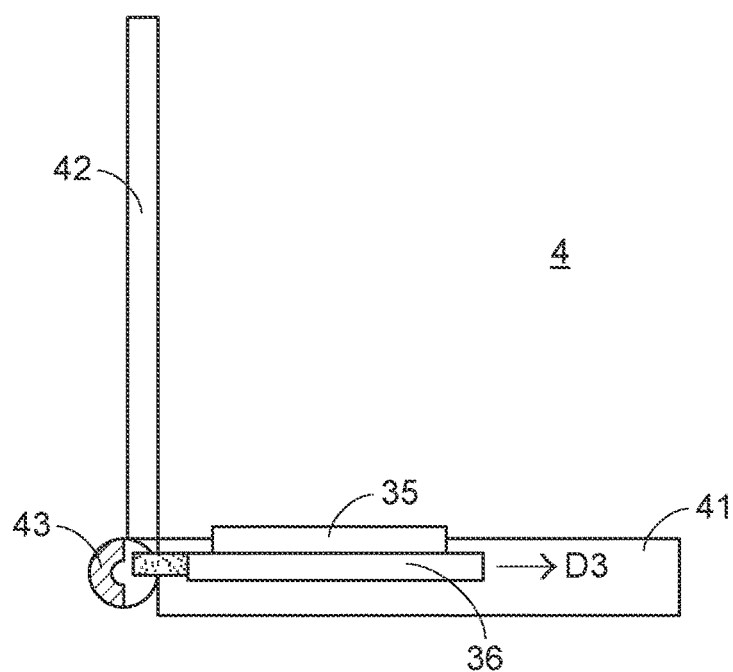
FIG. 14 is a schematic side view illustrating the notebook computer of FIG. 13, in which the top cover is in the opened position.
Figure 15:
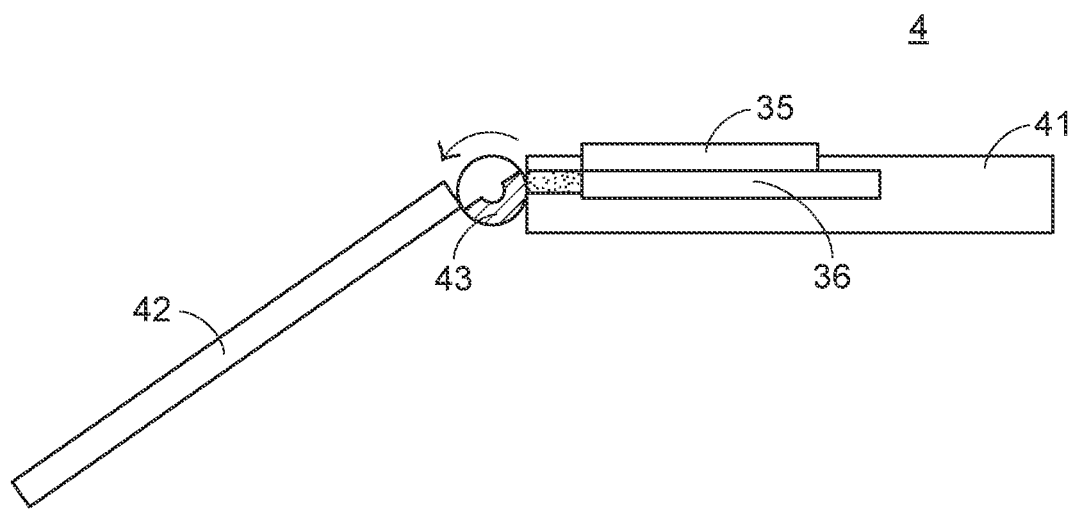
FIG. 15 is a schematic side view illustrating the notebook computer of FIG. 14, in which the top cover is being rotated in a direction toward a rear side of the base.
Figure 16:
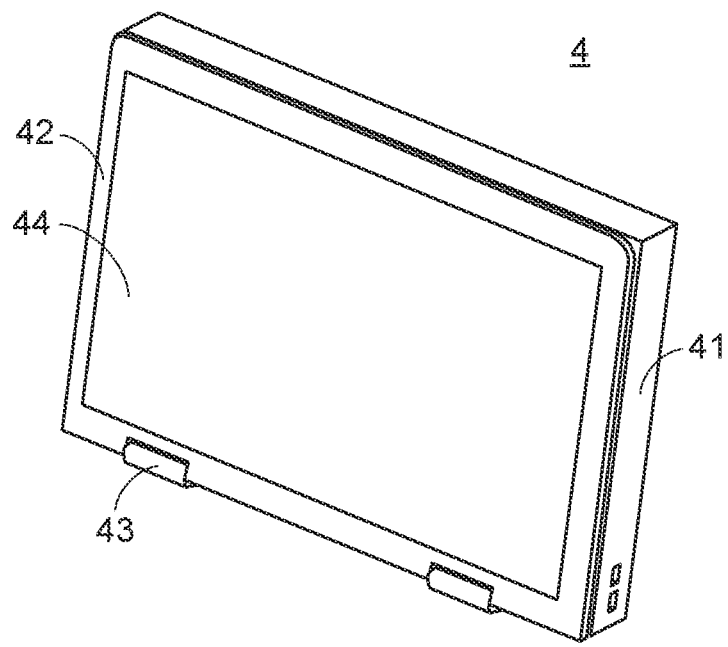
FIG. 16 is a schematic perspective view illustrating the notebook computer of FIG. 13, in which the operation mode of the notebook computer is switched to a tablet mode.

FIG. 13 is a schematic perspective view illustrating a notebook computer with the keyboard of the present invention, in which the notebook computer is in a laptop mode and the keyboard is in the usage status. FIG. 14 is a schematic side view illustrating the notebook computer of FIG. 13, in which the top cover is in the opened position. FIG. 15 is a schematic side view illustrating the notebook computer of FIG. 14, in which the top cover is being rotated in a direction toward a rear side of the base. FIG. 16 is a schematic perspective view illustrating the notebook computer of FIG. 13, in which the operation mode of the notebook computer is switched to a tablet mode.

Figure 1:
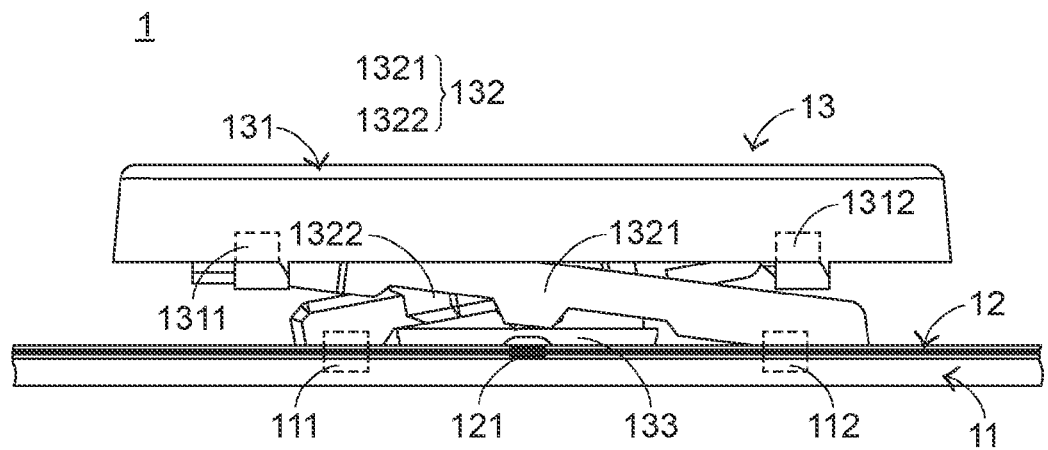
FIG. 1 is a schematic side view illustrating a portion of a conventional keyboard.
Figure 2:
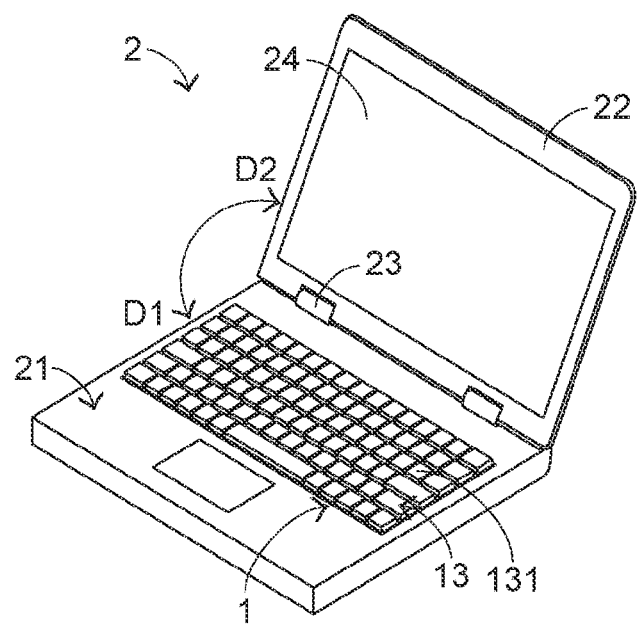
FIG. 2 is a schematic perspective view illustrating a portion of a conventional notebook computer with a keyboard.
Figure 3:
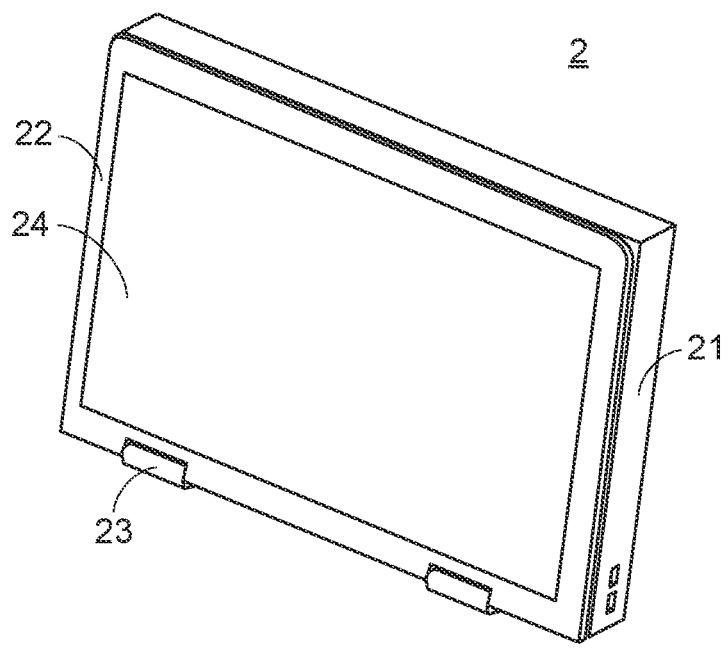
FIG. 3 is a schematic perspective view illustrating the conventional notebook computer of FIG. 2, in which the top cover is rotated in a direction toward a rear side of the base and contacted with a rear surface of the base and the display screen is exposed.

As shown in FIGS. 13-16, the notebook computer 4 comprises a base 41, a top cover 42, a rotary shaft 43, a driving mechanism, a keyboard 4 and a display screen 44. The display screen 44 is installed on the top cover 42. The keyboard 3 is installed on the base 41. The keyboard 3 has the structure and function similar to the keyboard of FIG. 3, and the detailed description is omitted. When the notebook computer 4 is in a laptop mode and the keyboard 3 is in the usage status, the key frame 32 is in the enabled position I1 (i.e., lower than the keycap 311). The top cover 42 is pivotally coupled with the base 41 through the rotary shaft 43. Consequently, the top cover 42 can be moved relative to the base 41. For facilitating the user to operate the notebook computer 4, the display screen 44 of the notebook computer 4 is a touch screen. Moreover, after the top cover 42 is rotated in a direction toward a rear side of the base 41 through the rotary shaft 43, the top cover 42 is folded to be contacted with a rear surface of the base 41 and the display screen 44 is exposed. Meanwhile, the notebook computer 4 has the outer appearance like a tablet computer. The notebook computer 4 having the appearance of the tablet computer is shown in FIG. 16. Consequently, the display screen 44 can be operated by the user through the user's finger or a touch pen.

The driving mechanism is activated in response to the rotation of the rotary shaft 43. In this embodiment, the driving mechanism is the movable plate 36 of FIG. 4. While the operation mode of the notebook computer 4 is switched from the laptop mode (see FIG. 13) to the tablet mode (see FIG. 16), the movable plate 36 is moved relative to the fixing plate 35 in the second axial direction Y (e.g., the direction D3) in response to the rotation of the rotary shaft 43. When the operation mode of the notebook computer 4 is changed to the tablet mode, the key frame 32 is ascended to the locked position I2 (i.e., at the same level with the keycap 311). Meanwhile, even if the key 31 is pressed by the user at this moment, the key 31 is not moved downwardly.

While the operation mode of the notebook computer 4 is switched from the tablet mode (see FIG. 16) to the laptop mode (see FIG. 13), the movable plate 36 is moved relative to the fixing plate 35 in the second axial direction Y (e.g., the direction D7) in response to the rotation of the rotary shaft 43. When the operation mode of the notebook computer 4 is changed to the laptop mode, the keycap 311 is returned to the enabled position I1 (i.e., lower than the keycap 311). Meanwhile, the user can depress the key 31 to perform the required operation. The interactions and operating principles of the movable plate 36 and the key frame 32 are similar to those of FIGS. 8 and 9, and are not redundantly described herein.

The above example of the notebook computer 4 is presented herein for purpose of illustration and description only. It is noted that numerous modifications and alterations may be made while retaining the teachings of the invention. For example, the driving mechanism is not restricted to the movable plate 36. The screw driving mechanism 37 of FIG. 10, the cam driving mechanism 38 of FIG. 11 and the driving mechanism 39 are also feasible.

From the above descriptions, the notebook computer 4 of the present invention has many benefits. As the top cover 42 is rotated in a direction toward the rear side of the base 41 through the rotary shaft 43, the top cover 42 is folded to be contacted with a rear surface of the base 41 and thus both of the display screen 44 and the keyboard 3 are exposed. When the notebook computer 4 is in the table mode, the key 31 of the keyboard 3 cannot be pressed down. When the notebook computer 4 is held by the user's hands and the keys 31 are touched by the user's hands, the keys 31 are not depressed to form the concave region. Consequently, the notebook computer 4 can be stably held by the user. Moreover, since the keys 31 are not erroneously pressed down, the problem of causing the erroneous operations of the notebook computer will be avoided.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A keyboard, comprising:
   a membrane circuit board comprising a membrane switch;
   a key frame comprising a receiving hole and a position-limiting structure, wherein the position-limiting structure is protruded externally from the key frame;
   a key corresponding to the membrane switch, wherein the key comprises a keycap, and the keycap is movable within the receiving hole when the keycap is depressed;
   a fixing plate disposed under the key frame, and comprising a guiding structure corresponding to the position-limiting structure; and
   a linking rod pivotally coupled to the key frame, wherein while the linking rod is rotated relative to the key frame to push the key frame, the position-limiting structure is moved along the guiding structure, so that the key frame is limited to be moved in a first axial direction.

2. The keyboard according to claim 1, wherein the keyboard further comprises a movable plate, a protrusion structure is protruded from a top surface of the movable plate, the protrusion structure has a perforation, and an end of the linking rod is penetrated through the perforation, wherein when the movable plate is moved relative to the fixing plate in a second axial direction, the linking rod is pushed by the protrusion structure, so that the linking rod is rotated relative to the key frame to push the key frame.

3. The keyboard according to claim 2, wherein the movable plate is disposed under the fixing plate, or the movable plate is disposed over the fixing plate.

4. The keyboard according to claim 1, wherein the key frame further comprises a hook, and the hook is protruded downwardly, wherein the linking rod is pivotally coupled to the key frame through the hook.

5. The keyboard according to claim 1, wherein the key frame further comprises a stopping structure, and the stopping structure is protruded from a sidewall of the receiving hole, wherein the keycap is stopped by the stopping structure, so that the keycap is not detached from the receiving hole.

6. The keyboard according to claim 1, wherein when the key frame is moved in the first axial direction to an enabled position lower than the keycap, the keycap is movable within the receiving hole in response to a pressing force on the keycap.

7. The keyboard according to claim 1, wherein the position-limiting structure is a position-limiting post, and the guiding structure is a position-limiting hole or a position-limiting groove that is extended in the first axial direction.

8. The keyboard according to claim 1, wherein the keyboard further comprises a driving mechanism, and the driving mechanism is connected with the linking rod, wherein when the linking rod is driven by the driving mechanism, the linking rod is rotated relative to the key frame to push the key frame.

9. The keyboard according to claim 8, wherein the driving mechanism is a screw driving mechanism or a cam driving mechanism.

10. The keyboard according to claim 8, wherein the driving mechanism comprises a transmission assembly, wherein when a first transmission part of the transmission assembly is moved downwardly to drive the linking rod to push the key frame, the key frame is moved in the first axial direction to a locked position at the same level with the keycap, wherein when the first transmission part is moved upwardly to drive the linking rod to push the key frame, the key frame is moved in the first axial direction to an enabled position lower than the keycap.

11. The keyboard according to claim 1, wherein the key further comprises a connecting element, and the connecting element is connected between the fixing plate and the keycap, wherein the keycap is moved upwardly or downwardly relative to the fixing plate through the connecting element.

12. The keyboard according to claim 11, wherein the connecting element is a scissors-type connecting element.

13. A notebook computer, comprising:
a base;
a top cover pivotally coupled with the base; and
a keyboard installed on the base, wherein the keyboard comprises:

a membrane circuit board comprising a membrane switch;
a key frame comprising a receiving hole and a position-limiting structure, wherein the position-limiting structure is protruded externally from the key frame;
a key corresponding to the membrane switch, wherein the key comprises a keycap, and the keycap is movable within the receiving hole when the keycap is depressed;
a fixing plate disposed under the key frame, and comprising a guiding structure corresponding to the position-limiting structure; and
a linking rod pivotally coupled to the key frame,
wherein while the top cover is rotated in a direction toward a rear side of the base, the linking rod is rotated relative to the key frame to push the key frame to an locked position at the same level with the keycap, and the position-limiting structure is moved along the guiding structure, so that the key frame is limited to be moved in a first axial direction.

14. The notebook computer according to claim 13, wherein the key frame further comprises a stopping structure, and the stopping structure is protruded from a sidewall of the receiving hole, wherein the keycap is stopped by the stopping structure, so that the keycap is not detached from the receiving hole.

15. The notebook computer according to claim 14, wherein while the top cover is rotated in a direction from the bottom side of the base toward a top side of the base, the linking rod is rotated relative to the key frame to push the key frame, so that the key frame is moved in the first axial direction to an enabled position lower than the keycap, wherein when the key frame is in the enabled position, the keycap is movable within the receiving hole in response to a pressing force on the keycap.

16. The notebook computer according to claim 13, wherein the keyboard further comprises a movable plate, a protrusion structure is protruded from a top surface of the movable plate, the protrusion structure has a perforation, and an end of the linking rod is penetrated through the perforation, wherein when the movable plate is moved relative to the fixing plate in a second axial direction, the linking rod is pushed by the protrusion structure, so that the linking rod is rotated relative to the key frame to push the key frame.

17. The notebook computer according to claim 16, wherein the movable plate is disposed under the fixing plate, or the movable plate is disposed over the fixing plate.

18. The notebook computer according to claim 13, wherein the position-limiting structure is a position-limiting post, and the guiding structure is a position-limiting hole or a position-limiting groove that is extended in the first axial direction.

19. The notebook computer according to claim 13, wherein the keyboard further comprises a driving mechanism, and the driving mechanism is connected with the linking rod, wherein when the top cover is rotated relative to the base and the linking rod is driven by the driving mechanism, the linking rod is rotated relative to the key frame to push the key frame.

20. The notebook computer according to claim 13, wherein the key further comprises a connecting element, and the connecting element is connected between the fixing plate and the keycap, wherein the keycap is moved upwardly or downwardly relative to the fixing plate through the connecting element.

* * * * *